United States Patent [19]
Ehrlich et al.

[11] Patent Number: 4,511,606
[45] Date of Patent: Apr. 16, 1985

[54] METHOD FOR INCREASING THE ENDURANCE AND REDUCING THE FRICTION OF OIL LUBRICATED CONICAL ROLLER BEARINGS

[75] Inventors: Willibald Ehrlich, Schorndorf; Hans Jooss, Stuttgart; Rainer Hornung, Schlierbach, all of Fed. Rep. of Germany

[73] Assignee: Daimler-Benz Aktiengesellschaft, Stuttgart, Fed. Rep. of Germany

[21] Appl. No.: 494,363

[22] Filed: May 13, 1983

[30] Foreign Application Priority Data

May 14, 1982 [DE] Fed. Rep. of Germany ....... 3218145

[51] Int. Cl.³ .................. B05D 3/02; C10M 5/02; C10M 7/04; C10M 7/16
[52] U.S. Cl. .................. 427/386; 252/12; 252/27; 252/29; 427/388.2; 427/388.3
[58] Field of Search ............ 252/12, 12.2, 27, 29; 427/386, 388.2, 388.3

[56] References Cited

U.S. PATENT DOCUMENTS

| | | | |
|---|---|---|---|
| 3,717,576 | 2/1973 | Hiratsuka et al. | 252/12 |
| 3,850,820 | 11/1974 | Korshak et al. | 252/12 |
| 4,055,503 | 10/1977 | Anselment et al. | 252/12 |
| 4,329,238 | 5/1982 | Mitrofanova et al. | 252/12 |

Primary Examiner—Michael R. Lusignan
Attorney, Agent, or Firm—Craig & Burns

[57] ABSTRACT

The present invention describes a method for increasing the endurance of oil lubricated conical roller bearings, in which the guide surface is coated with a lubricating paint that is insoluble in oil. A coating of a molybdenum disulphide lubricating paint with a thickness of 3 to 8 µm is preferred. The coated bearing also exhibits reduced friction and quieter running, even when the lubricating paint has been worn off.

5 Claims, 1 Drawing Figure

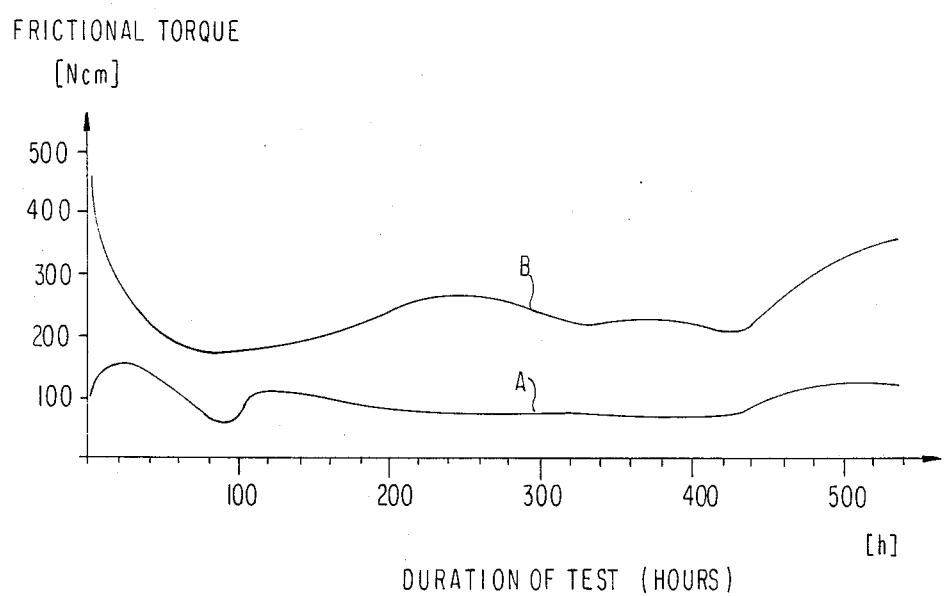

METHOD FOR INCREASING THE ENDURANCE AND REDUCING THE FRICTION OF OIL LUBRICATED CONICAL ROLLER BEARINGS

TECHNICAL FIELD

The present invention relates to a method for increasing the life and reducing the friction of oil lubricated conical roller bearings. More particularly, the invention relates to a method of coating conical roller bearings with a lubricating paint containing a solid lubricant that is insoluble in oil.

BACKGROUND ART

Oil lubricated roller bearings are subjected to both radial and axial pressures. Radial pressure causes rolling friction, whereas axial pressure causes sliding friction, which is more dangerous. The lubrication between the guide surfaces of the bearing rings and the end surfaces of the rolling bodies is a difficult problem in such bearings. Problems arise because the conditions for maintaining a lubricant film capable of supporting loads at these points are unfavorable at both low rotational speed and particularly when rotation begins. When the bearing is at rest, the lubricant flows out of the gap between the hollow bodies and moving surfaces, causing the lubricant film thickness to be reduced to zero. With high axial loads, moving surfaces become heated and damage to the parts in contact can occur.

In order to reduce the dangerous sliding friction, it is known in the art to introduce additional sliding means, specifically, ball bearings between the end surfaces of the rolling bodies and the guide surfaces of the bearing rings. The assembly of the balls in the bearing is, however, difficult. Thus, as disclosed in German Patent Specification No. 102,583, one or more freely floating rings have also been employed as additional sliding means between the rolling bodies and the guide surface. However, such a procedure also requires a high expenditure in material and work.

The aim underlying the present invention essentially resides in providing a method for increasing endurance and reducing the friction of oil lubricated conical roller bearings that is simple to carry out and inexpensive.

In accordance with the aim of the present invention, the life of the bearing can be substantially increased and friction greatly reduced by coating the guide surface with a lubricating paint. Advantageously, the paint is insoluble in oil and contains a solid lubricant, in particular, molybdenum disulphide.

The use of molybdenum disulphide as a lubricant in rolling bearings is known, as in, for example, German Patent Specification No. 976,124. However, this involves dry rolling bearings in which molybdenum disulphide represents the only lubricant. Thus, according to German Patent Specification No. 976,124, the bearing is first etched with a rough surface. A suspension of molybdenum disulphide in a slightly volatile solvent is introduced into the pores of the bearing. German Patent Specification No. 976,124 also describes a method where a layer of molybdenum is applied to the metal surface of the bearing. This layer is then converted to molybdenum disulphide by means of a chemical process on the surface of the bearing. Disadvantageously, this method is extremely expensive and somewhat difficult to control.

It is also known to lubricate rolling bearings by applying a lubricating paint to the running grooves of the races, as in, for example, German Offenlegunsschrift No. 21 20 917. Disadvantageously, however, the lubrication of the bearing by lubricating paint is of a relatively short duration. Another disadvantage is that larger bearing clearance must be available between the rolling bodies and the running groove compared with oil lubricated bearings. This has further disadvantageous effects on endurance, and, due to the additional dynamic forces, also on the running and vibration bahavior.

SUMMARY OF THE INVENTION

Accordingly, it is an object of the present invention to provide a method for increasing the endurance and reducing the friction of oil lubricated conical roller bearings that is simple to carry out and inexpensive to use.

Another object of the present invention is to provide a method for increasing the endurance of oil lubricated conical roller bearings wherein the friction coefficient of the coated bearing is markedly reduced.

Yet another object of the present invention is to provide a method for increasing the endurance of oil lubricated conical bearings wherein it is possible to use smaller bearings for the same load or to apply greater loads to the existing bearings.

Another object of the present invention is to provide a method for increasing the endurance of oil lubricated conical roller bearings wherein the bearings exhibit quieter running even when the lubricating paint has worn off.

Still another object of the present invention is to provide a method for increasing the endurance and reducing the friction of oil lubricated conical bearings comprising:
  (a) coating the guide surfaces of the conical bearings with a lubricating paint containing a solid lubricant, and the paint is insoluble in oil; then,
  (b) drying the guide surfaces.

Yet another object of the present invention is to provide a method for increasing the endurance and reducing the friction of oil lubricated conical roller bearings, comprising:
  (a) coating the guide surfaces with a lubricating paint containing a solid lubricant containing molybdenum disulphide, and
  (b) applying the coating of lubricating paint to a thickness of about 4 to 6 $\mu$m, then
  (c) drying the guide surfaces.

BRIEF DESCRPITION OF DRAWING

The objects, features and advantages of the present invention will be described in connection with the accompanying drawing which shows the markedly reduced frictional torque of a bearing coated according to the present invention.

DESCRIPTION OF THE INVENTION

The guide surface of a conventional oil lubricated conical bearing is coated with a lubricating paint that is insoluble in oil and contains a solid lubricant. Molybdenum disulphide is preferred as the solid lubricant. Other suitable lubricants include graphite, molybdenum diselenide, molybdenum ditelluride, tungsten sulphide or similar lubricants. Preferably, the guide surface is coated with a lubricant paint layer of about 3 to 8 $\mu$m thickness when dried. Coating with lubricating paint to a thickness of about 4 to 6 μm is preferred. A coating which exceeds a thickness of 8 μm is disadvantageous because this may reduce the bearing prestress during running in.

The lubricating paint containing the solid lubricant is dispersed in a binder containing, for example, phenol resins, melamine resins, epoxide resins, alkylpolyester resins or any similar resin. The application of the lubricating paint to the guide surface normally occurs by spraying or printing.

The objects, features and advantages of the present invention will become more apparent from the following example, which must not be construed as limiting the invention in any manner.

EXAMPLE

In this test, two commercially available conical roller bearings with an external diameter of 76 mm and an internal diameter of 36.5 mm are used. The guide surfaces, which are on the inner races, are coated with a 4-6 μm thick layer of a lubricating paint containing molybdenum disulphide dispersed in a binder containing polymide-imide with a molybdenum disulphide content of approximately 15%. The paint is manufactured by Dow Corning, Type "MOLYKOTE" Q 5-74 09 lubricating paint.

The guide surfaces are then allowed to dry. Once dry, the bearings are subjected to a 10 kN axial load by plate springs. Each bearing has an oil circulation. Two bearings were associated with each test. One bearing is driven for a period of two minutes, while the other is at rest; then there is a changeover. During the rest period, the lubricating oil is expelled from the contact between the guide surface inner ring and the running surface of the conical roller. Thus, a new lubricating film has to be built up on each start.

The results of the test are depicted in the accompanying drawing, wherein curve A shows the frictional torque of the bearing coated with the lubricating paint and curve B shows the frictional torque of the uncoated bearing. After 600 hours, the test is stopped. As is clear from the drawing, the friction coefficient of the coated bearing is lower than that of the uncoated bearing throughout the entire duration of the test. This is true although the lubricating paint film had already been substantially worn off after approximately 24 hours. It can be clearly seen that the bearings coated according to the present invention exhibit a long term improvement in the desired properties, i.e. a greater endurance and a reduced friction.

While we have shown and described one embodiment in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A method for increasing endurance and reducing friction of high-precision, oil lubricated conical bearings comprising:
    (a) coating guide surfaces of the conical bearings with a lubricating paint containing a solid lubricant, the paint being insoluble in oil and the thickness of the coating being less than about 8 μm, then
    (b) drying the guide surfaces.

2. The method according to claim 1, further comprising applying solid lubricant including molybdenum disulphide, graphite, molybdenum diselenide, molybdenum ditelluride or tungsten sulphide.

3. The method according to claim 1, further comprising applying the lubricating paint to a thickness of about 3 to 8 μm.

4. The method according to claim 1, further comprising applying a lubricating paint dispersed in a binder including phenol resins, melamine resins, epoxide resins, or alkyl polyester resins.

5. A method for increasing endurance and reducing friction of oil lubricated conical roller bearings, comprising:
    (a) coating the guide surfaces of the conical roller bearing with a lubricating paint containing a solid lubricant of molybdenum disulphide, and
    (b) applying the coating of lubricating paint to a thickness of about 4 to 6 μm, then
    (c) drying the guide surfaces.

* * * * *